United States Patent Office 3,468,824
Patented Sept. 23, 1969

3,468,824
EPOXY COMPOSITION
Thomas H. Williams, Elmhurst, Ill., assignor to Morton International, Inc., a corporation of Delaware
No Drawing. Continuation-in-part of application Ser. No. 307,332, Sept. 10, 1963. This application Dec. 13, 1965, Ser. No. 513,535
Int. Cl. C08g *30/12*
U.S. Cl. 260—18                              14 Claims This application is a continuation-in-part of my copending application Ser. No. 307,332, filed Sept. 10, 1963.

This invention relates to epoxy compositions, and especially to such compositions suitable for use in molding operations such as compression, injection, or transfer molding.

It has been known to prepare epoxy molding compounds which contain an epoxy resin and an amount of a cross-linking or curing agent sufficient to cure the resin. The curing agent is normally used in approximately stoichiometric amounts with the unreacted epoxide groups of the resin and can be an anhydride of a dibasic or other polybasic organic acid, a diamine, a urea compound, a dianiline, a polyamide, a phenolic resin, etc. The present invention is concerned with improvements in epoxy molding compound systems employing the anhydride curing agent.

It is a general object of the present invention to provide new and useful epoxy molding compounds of the character described.

Another object of this invention is to provide a new and useful molding compound of the type employing an anhydride curing agent, wherein an accelerator or catalyst is added for acting conjointly with the anhydride curing agent to obtain a faster cure rate.

A further object of this invention is to provide a molding compound in accordance with any of the foregoing objects which has good shelf life and a cure rate faster than that attainable by use of an anhydride alone.

In compression or injection molding procedures, mold halves are brought together and a molding compound, e.g., finely divided or powdery or even liquid molding compound, is introduced under pressure through a sprue or the like. Where solid molding compounds are used, they are converted to a liquid or melt state, and this is often done during passage of the compound through the sprue from the heat of the mold maintained at molding temperature. Such molding compositions are usually thermosetting, e.g., in prepolymer form, and the mold is maintained at a temperature sufficiently elevated to complete the polymerization of the molding compound in forming the molded article.

Molding compounds used in such procedures are usually free-flowing for only a very short flow length, requiring high pressures for introducing the molding compound into the mold cavity so that the molding compound reaches the mold cavity before it sets up to a solid mix. Thus, it is exceedingly difficult to conduct some desirable molding operations. For example, where it is desired to encapsulate a fragile article, such as a glass Reed switch, diodes and the like, in a plastic material, the article is suspended in the mold but the introduction pressure for the molding compound may be so great as to break the fragile article. Lesser pressures would not be sufficient to get the molding compound into the mold prior to solidification and the desired encapsulation would not be accomplished thereby.

It is therefore still another object of this invention to provide a new and useful epoxy molding compound having good flow characteristics before it sets up at approximately molding temperatures so that the compound can be introduced into a mold using low temperatures without setting up in the sprue so that the molding compound can be used to encapsulate fragile articles which may be broken in the mold by higher pressures.

Other objects of this invention will be apparent from the following description.

I have discovered that those epoxy compositions, e.g., potting, casting, coating and especially molding compositions which contain an anhydride curing agent have an improved rate of cure imparted thereto by the inclusion of an organo-metal compound which is compatible and miscible with the epoxy resin of the compound. The epoxy compositions can be liquid or solid, but in the preferred form they are solid molding compounds. The organo-metal compound used in the compositions of this invention is an organo-zinc compound, advantageously a salt or soap, of a carboxylic acid, e.g., a $C_2$ to $C_{20}$ open chain carboxylic acid, preferably a fatty acid. Especially useful in the compositions of this invention is zinc stearate. Examples of other organo-zinc compounds include the zinc salts or soaps of acetic, pentanoic, capric, caprylic, myristic, caproic, oleic, linoleic, etc. acids, as well as the salts of dicarboxylic acids and the alcoholates and other complexes and compounds of zinc. More specific dicarboxylic acids are, for example, the acids of the anhydrides given hereinafter as curing agents.

Although the compounds of this invention are discussed hereafter with reference to molding compounds, it will be apparent that the invention is intended to be applicable to other epoxy compounds or compositions. The anhydride can be used in the molding compound in the usual amounts or, more often, in slightly less than conventional amounts. For example, the anhydride can be used in less than stoichiometric amounts, even down to one-half the stoichiometric amount to effectively cure the epoxy resin. Preferably, the anhydride is used in amounts from about .5 to 1.5 times the stoichiometric amount, although more or less can be used. However, the amount of anhydride used should be sufficient to give the desired cure in combination with the zinc compound but should be insufficient to dilute the cured product to an extent detracting from the desired properties of the ultimate molded product.

Metal soaps can function as mold release agents in epoxy resins, and it is intended that the present zinc compound be used in an amount over and above any amount needed to impart mold release properties. Where other mold release agents are included in the composition to give proper mold release properties and the zinc compound need not function as a mold release agent in addition to its function as a conjoint actant with the anhydride, the zinc compound is usually used in an amount between 0.1 and 25% by weight based on the epoxy resin. Where the zinc compound is included for the additional purpose of mold release, the .1 to 25% range is over and above the amount required for good mold release. For example, it requires at least 3 to 4% zinc stearate for mold release in most epoxy compositions and it more usually requires about 5% zinc stearate based on epoxy resin. Thus, where the zinc compound is to be used as a mold release compound in addition to its curing function, it would advantageously be used in an amount between 5 and 30% by weight and preferably about 7 to 20% by weight based on epoxy resin.

Any of the epoxy resins usually used in molding compounds can be used as the epoxy resin in the compositions of this invention. The epoxy resin may be, for example, a polymeric polyether of a dihydric phenol, or a glycidyl ether of a polyhydroxy phenol, such as the diglycidyl ether of bisphenol A which is formed by the reaction of a slight molar excess of epichlorohydrin with bisphenol A. The diglycidyl ether of bisphenol A can be identified by the following structural formula:

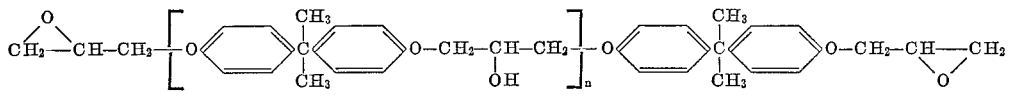

wherein $n$ represents the number of repeating units in the resin chain denoting the molecular weight of the resin. The actual number represented by $n$ is not critical, although a variance in $n$ will usually vary the molecular weight of the resin. Resins of the above formula include the series of Epon resins, e.g., Epon 834, Epon 1001, Epon 1002, Epon 1031, Epon 1009; the Epi-Rez resins, e.g., Epi-Rez 515 and Epi-Rez 5163; the Genepoxy resins; the Araldite resins; and the like.

As still another example, the epoxy resin may be an epoxylated novolac resin which can be represnted as containing the following general structure:

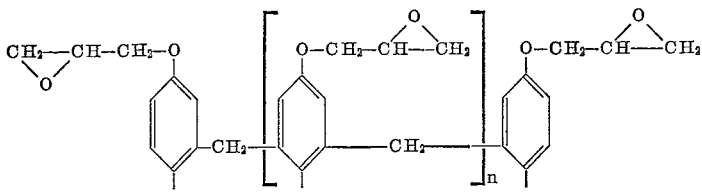

wherein $n$ is as described above. These include the epoxy compounds marketed by Koppers Company, Inc. under the tradename Kopox, e.g., Kopox 357 or 357A, Kopox 655, Kopox 737A and Kopox 997A, some of which are epoxylated cresol novolac resins in which the benzene ring of the above formula is methyl substituted. Such Kopox resins typically have reported properties such as:

TYPICAL PROPERTIES OF UNCURED KOPPERS EPOXY RESINS

| | Kopox 357A | Kopox 737A | Kopox 997A |
|---|---|---|---|
| Molecular weight approx | 540 | 1,080 | 1,270 |
| Functionality: | | | |
| (a) (See structural formulas) | 0.3 | 1.2 | 1.6 |
| (b) | 1.7 | 3.8 | 4.4 |
| Epoxide functionality | 2.7 | 4.8 | 5.4 |
| Epoxide equivalent weight | 200 | 225 | 235 |
| Esterification equivalent weight | 90 | 90 | 90 |
| Softening point (Durrans), °C | 35 | 73 | 99 |
| Specific gravity at 25° C./40° C | 1.12 | 1.16 | 1.19 |
| Oxirane-oxygen content, weight percent | 7.2-7.6 | 7.0-7.4 | 6.6-7.0 |
| Total chlorine, weight percent | 0.5 | 0.5 | 0.5 |
| Ionic chlorides, p.p.m | 50 | 50 | 50 |

These epoxy compounds, e.g., the Kopox's, have epoxide functionality greater than 2 and can be used alone or in combination with other epoxy compounds. They impart faster cure properties to the molding compound due to such higher functionality without materially damaging good shelf life characteristics, and are therefore among the preferred class of epoxy resins.

Other useful novolacs include ECN 1273 which is also an epoxidized cresol novolac and is fast curing and within the preferred class.

Further, the epoxy resin may be a modified epoxy resin, e.g., esterified with a suitable acid at the hydroxy groups near the ends of the epoxy resin chain.

The anhydride curing agent can be any anhydride of a dicarboxylic or other polycarboxylic acid suitable for cross-linking the epoxy resin at cure temperatures. These include, but are not limited to, the following cyclic polycarboxylic acid anhydrides: phthalic anhydride, benzophenonetetracarboxylic dianhydride (hereafter BTDA), the dianhydride of 1,2,3,4-cyclopentanetetracarboxylic acid (hereafter CPDA), trimellitic anhydride, nadic anhydride, chlorendic anhydride, hexahydrophthalic anhydride, and the like. Other useful anhydride curing agents are Amoco TMX 220 which is apparently the reaction product of trimellitic acid with the diacetic acid derivative of ethylene glycol, and Amoco TMX 330 which is the reaction product of triacetin with trimellitic anhydride, both of which reaction products are apparently described by A. G. Hirsch et al. in U.S. Patent 3,183,248. Such curing agents are well known in the art, and their selection or the use of other anhydride curing agents in lieu thereof is not critical to this invention.

Mold release agents other than the zinc compound which are useful to impart the mold release property include such compounds as carnauba wax, calcium stearate, Feck oil, polymekon wax, silicones, candelilla wax, etc. These ingredients are normally used in amounts between about 1 and about 5-10% based on resin, depending upon their effectiveness.

The epoxy molding compounds of this invention can be liquid or solid and usually include a significant amount, and usually a major amount, of inorganic filler. Such fillers, usually in lesser amounts than used herein, are conventional in molding compounds, and those known and available to the art can be used. Exemplary of suitable fillers are calcium carbonate, silica flour, titanium dioxide, talc, mica, mylar film scrap, iron carbonyl, barytes, etc. The preferred solid molding compounds, e.g., powder, have the ability to accommodate and utilize a far greater proportion of such fillers than has heretofore been normal for solid molding compounds. Other additive ingredients such as accelerators, flame retardants, and reinforcing agents can also be included in the compositions.

The epoxy molding compounds can be prepared by heating the epoxy resin to a temperature substantially below its cure temperature, e.g., to a temperature of about 200° F., to form a hot mass of liquid resin, pouring the hot resin into a blender and mixing the resin in the blender with the anhydride, the zinc compound and the filler. Where epoxy resins which are solid at room temperature are used, the hot liquid constitutes a melt. After the mixing is complete, the resulting mass is dumped to a tray and permitted to cool. The cooling can be by refrigeration below ambient temperatures if desired or necessary. The cooled solidified material is then ground into a powder as the final product. Where cooling below ambient conditions is necessary to solidify the resin mix and it is desired to provide a powder product, the resulting ground powder should also be kept refrigerated to retain its distinct particulate complexion; however, if a paste product is desired, the resin mix is merely removed from refrigeration and permitted to warm to paste consistency.

In the manufacture of the molding compounds, in a preferred procedure, the hot epoxy resin is first mixed with the anhydride and then the zinc compound is added and the mix is maintained at elevated temperature for a period of time to partially polymerize or cure the mixture to form a prepolymer of the epoxy resin and acid anhydride. The partial polymerization temperature at which the prepolymer is formed is below the complete polymerization temperature, i.e., the temperature which would be used in curing the product during later molding procedures.

Since the polymerization reaction is exothermic in nature, it is desirable to keep the partial temperature significantly below the complete cure temperature, at least about 25° F. and preferably at least 50° F. below the cure temperature. This temperature is still high enough to form the prepolymer. The temperature is also preferably below the temperature known to those in the art as the half-way temperature for a mixture of epoxy material and acid anhydride; the half-way temperature is the temperature at which the exothermic reaction will take over in the absence of applied cooling and will materially increase the temperature of the mix to cure temperature without applied heat.

The following examples are given for purposes of illustration and are not intended to be limiting on the present invention. All parts given are parts by weight unless otherwise indicated.

EXAMPLE I 16 parts Epon 1001 and 8.9 parts chlorendic anhydride were brought to a temperature of 200° F. and blended in a Baker-Perkins blender. 2 parts of zinc stearate were added, followed by 0.3 part carbon black and 72.8 parts silica. After thoroughly mixing, the resulting mass was dumped to a cooling tray, permitted to cool to room temperature, and then ground to powder form.

EXAMPLE II 20 parts Epon 1001, 6 parts nadic anhydride, and 2 parts zinc stearate are blended at 200° F. as in Example I, followed by addition of 0.5 part carbon black and 71.5 parts silica, dumping, cooling and grinding.

EXAMPLE III 20 parts Epon 1001, 3.0 parts trimellitic anhydride and 2 parts zinc stearate are blended as in Example I, followed by addition of 0.5 part carbon black and 74.5 parts silica, dumping, cooling and grinding.

The products of Examples I, II and III cure at temperatures ranging from 250° F. to 350° F. within periods of 1 to 5 minutes.

EXAMPLE IV 20 parts Epon 1001 are blended with 6 parts BTDA and 2 parts zinc stearate as in Example I, followed by addition of 61.0 parts silica flour, dumping, cooling and grinding. The product cures at 300° F. in about 1 to 2 minutes.

EXAMPLE V 10 parts Epon 1001, 10 parts ECN 1273, 8 parts TMX 330 and 2 parts zinc stearate are blended as in Example I followed by addition and blending in of 58.0 parts silica flour and 1.0 part pigment, dumping, cooling and grinding. The resulting powder has a cure time of 1 to 2 minutes at about 300° F.

EXAMPLE VI 10 parts Epon 1001, 10 parts ECN 1273, 8 parts TMX 220 and 2 parts zinc stearate are blended as in Example 1, followed by blending in 58.5 parts silica flour, dumping, cooling and grinding. The resulting product has a cure time of about 5 minutes at 300° F.

EXAMPLE VII 20 parts Epon 1001, 4.2 parts CPDA and 2 parts zinc stearate are blended as in Example I followed by addition and blending in of 73.3 parts silica flour and .5 part pigment, dumping, cooling and grinding. The resulting powder has a cure time of about 5 minutes at about 300° F.

EXAMPLE VIII

A stable, long flowing, low pressure epoxy compound was prepared by intimately blending a melt of 250 parts Kopox 357A (a polycondensate of epichlorohydrin and ortho-cresol formaldehyde novolac) and 250 parts Epon 1001 (a normally solid polycondensation product of bisphenol A and epichlorohydrin having an epoxide equivalent weight of 425 to 550 and a Gardner-Holdt viscosity of D through G at 40% non-volatiles content in Dowanol DB solvent at 25° C.), at 210° F. and blending for five minutes until homogeneous. 300 parts phthalic anhydride were then added and mixing was continued for 10 minutes. Heating was discontinued and 25 parts of candelilla wax were added as mold release compound and 30 parts of colored matter were added. 2200 parts of silica were also added as filler material and blending was continued five minutes until the solids were completely dispersed into intimate admixture with the melt. While the mixture was still at elevated temperature, above 185° F., 100 parts of zinc stearate were added and the blending was continued to thoroughly mix the zinc stearate for about six minutes, producing a viscous mass. The mass was then cooled to a solid in the form of separate hard lumps which were ground to a sandy consistency to form a solid molding powder. The product of Example VIII is curable to a completely polymerized solid plastic mass at a temperature of about 300° F. in two to three minutes using mold introduction pressures lower than 30 p.s.i.

The composition of Example VIII was tested on a Hull Spiral Mold designed for testing flow length. The Hull Spiral Mold is a mold constructed generally of two mold halves having flat opposed surfaces, the surface of one mold half including a spiral cavity extending from the central portion thereof spirally outwardly into the exterior, a curvilinear mean distance slightly greater than 103″. The distance in the spiral cavity is marked in inches. A sprue is provided through the other mold half for introduction of molding compound to the central end of the spiral cavity. Using the molding compound of Example VIII (after storage at room temperature for 14 days) introduced into the Hull Spiral Mold in a Hull 359E ten-ton press at about 1420 p.s.i., full transfer speed, under an introduction pressure less than 30 p.s.i., with the mold maintained at 300° F., ±5° F. and, after a two-minute cure, it was found that the molding compound exited from the other or outer end of the mold cavity and therefore had flowed a length greater than 103″ without solidification thereof. Another sample of Example VIII, after storage at room temperature for two months, flowed 60″ in the mold under the same conditions, showing good performance even after extended storage, i.e., good shelf life properties. The same test was conducted on conventional molding powders with the same conditions except that 30 p.s.i. introduction pressure was used, and it was found that such molding powders flowed considerably less in the spiral mold cavity. For example, a long flow material identified as Pacific Resin EMC-90 flowed only 52 inches under the same conditions.

Powders prepared in accordance with the procedure of Example VIII were molded in one-half inch width sections under the following cure temperatures for the cure times indicated to illustrate their fast curing properties, especially at elevated temperatures:

| Temperature, ° F.: | Cure time, min. |
|---|---|
| 250 | 9 |
| 270 | 5 |
| 300 | 3 |
| 325 | 2.5 |
| 350 | 2 |

EXAMPLE IX 100 parts Epi-Rez 515, 60 parts phthalic anhydride and 20 parts zinc stearate are blended as in Example I, followed by addition and blending of 360 parts calcium carbonate, dumping, cooling and grinding. The product cures at 300° F. in 1 to 2 minutes.

EXAMPLE X 50 parts Epon 834, 50 parts Epon 1001, 45 parts phthalic anhydride and 20 parts zinc stearate are blended as in Example I, followed by addition and blending of 370 parts calcium carbonate and 6 parts nigrazine black, dumping, cooling and grinding. The resulting powder cures at 300° F. in 1 to 2 minutes.

EXAMPLE XI 50 parts of Epon 1001, 50 parts Epon 834, 50 parts phthalic anhydride and 10 parts zinc stearate are blended as in Example I, followed by addition and blending of 350 parts silica, dumping, cooling and grinding. The resulting powder has a cure time of 1 to 2 minutes at 350° F.

The above examples illustrate the improved cure times attainable with molding powders prepared according to the present invention. In other tests run, a combination of Epon 1001 and a stoichiometric amount of BTDA required a cure time of 12 minutes at 300° F. A combination of Epon 1001 and 12½% by weight zinc stearate resulted in a heterogeneous partially cured product when cured over an extended period of time at normal cure temperature conditions, i.e., 300° F. By contrast, a combination of Epon 1001, the stoichiometric amount of BTDA and 12½% zinc stearate gave a completely cured product in 2 minutes at about 300° F. It was not possible by increasing amounts of zinc stearate and BTDA, in the absence of each other, to obtain a molding powder which could be similarly cured in 2 minutes.

It is an advantage of the present epoxy molding compounds that they are able to accommodate large quantities of fillers, as has been demonstrated by the above examples. Further, the molding powder has high reactivity at usual molding temperatures, i.e., it cures quickly, although it is also stable at room temperature. Thus, the particular curing condition of zinc compound and anhydride combination appears to give a latent catalyst effect permitting high reactivity at elevated temperatures and low reactivity at room temperature. The products formed by curing the molding compounds have high tensile, flexural and compressive strength, good electrical properties, and excellent resistance to chemicals such as acids, solvents, corrosive liquids and corrosive gases. Products molded from the compositions also had good resistance to degradation and deformation by high temperatures.

The foregoing detailed description is given for clearness of understanding only, and no unnecessary limitations are to be understood therefrom, as some modifications will be obvious to those skilled in the art.

I claim:

1. A free-flowing shelf stable, fast curing solid molding powder for producing a molded article having high tensile, flexural and compressive strength, and resistance to degradation and deformation by high temperatures, comprising the comminuted solid reaction product formed by preparing a melt mixture of epoxy resin, filler and curing agent, blending the melt at an elevated temperature to form a homogeneous mixture at least 25° F. below the complete cure temperature, which complete cure temperature falls between 250° F. and 350° F., of said mixture and in the absence of takeover by exothermic reaction until the solids of said mixture are wet out with liquid and the mixture forms, substantially short of complete cure, a partial reaction product between resin and curing agent which is solid at room temperature, cooling the mixture until solidified and comminuting the resulting solid to form said powder, said curing agent comprising 0.5 to 1.5 equivalents of cyclic polycarboxylic acid anhydride per equivalent of epoxy resin and 0.1 to 25 weight percent, based on epoxy resin, of zinc salt of a $C_2$ to $C_{20}$ carboxylic acid over and above any amount of said zinc salt used for mold release functions, said filler being present in said mixture in an amount by weight in excess of the total epoxy resin and anhydride, said powder being curable by heating to a melt at said cure temperature to a completely cured product as said molded article within about 5 minutes and, in spite of the fast cure rate, said melt of the powder being free-flowing through a sprue into an encapsulating mold at said complete cure temperature and at a low mold pressure to fill the mold prior to curing of melt in the sprue, and said powder being shelf stable with respect to said free-flowing and curing properties for at least 2 months at room temperature.

2. The molding powder of claim 1 wherein said anhydride comprises benzophenone tetracarboxylic acid anhydride.

3. The molding powder of claim 1 in which said preparing step comprises including a mold release agent in the melt mixture of epoxy resin, filler, and curing agent.

4. The molding powder of claim 3 wherein said mold release agent is up to 5% zinc stearate based on epoxy resin.

5. The molding powder of claim 3 wherein said mold release agent is carnauba wax.

6. The molding powder of claim 3 wherein said mold release agent is candelilla wax.

7. The molding powder of claim 3 wherein said mold release agent is a silicone.

8. The molding powder of claim 1 wherein the zinc salt is zinc stearate.

9. The molding powder of claim 1 wherein the total amount of zinc salt present is in the range of 10% to 30% by weight based on epoxy resin.

10. The molding powder of claim 1 wherein said epoxy resin is a normally solid epoxy resin.

11. The molding powder of claim 1 wherein the blending temperature is at least about 50° F. below the complete cure temperature.

12. The molding powder of claim 1 wherein said filler is present in an amount of at least 58 part by weight per 20 parts by weight epoxy resin.

13. The molding powder of claim 1 wherein said filler comprises silica.

14. The molding powder of claim 1 wherein said filler comprises talc.

References Cited

UNITED STATES PATENTS

| | | | |
|---|---|---|---|
| 3,344,096 | 9/1967 | Manasia et al. | |
| 3,269,975 | 8/1966 | Lee. | |
| 3,269,974 | 8/1966 | Childs. | |
| 3,025,263 | 3/1962 | Lee et al. | |
| 2,866,768 | 12/1958 | Bolstad | 260—830 X |
| 2,801,229 | 7/1957 | De Hoff et al. | 260—47 |

FOREIGN PATENTS 903,933    8/1962    Great Britain.

DONALD E. CZAJA, Primary Examiner

C. W. IVY, Assistant Examiner

U.S. Cl. X.R.

260—28, 29.1, 37, 47, 78.4, 830